March 17, 1942.  M. F. WATERS  2,276,277
LIQUID AND GAS SEPARATOR
Filed Oct. 10, 1940   2 Sheets-Sheet 1

Inventor
M.F. WATERS,
By
Attorneys

March 17, 1942.  M. F. WATERS  2,276,277
LIQUID AND GAS SEPARATOR
Filed Oct. 10, 1940  2 Sheets-Sheet 2

Inventor
M. F. WATERS,
By
Attorneys

Patented Mar. 17, 1942

2,276,277

UNITED STATES PATENT OFFICE 2,276,277

LIQUID AND GAS SEPARATOR

Millard F. Waters, Tulsa, Okla., assignor to Hanlon-Waters, Inc., Tulsa, Okla.

Application October 10, 1940, Serial No. 360,645

3 Claims. (Cl. 183—105)

My invention consists in new and useful improvements in liquid and gas separators primarily adapted for use in the separation of oil and gas and has for its objects to provide a device of this character which is simple in construction, economical to manufacture and install, and possesses a maximum of efficiency in extracting liquids and mist from a mixture of oil and gas.

Another object of my invention is to provide a separating unit which may be employed in connection with any conventional oil and gas separator tank requiring only minor alternations for adaptation.

A further object of my invention is to provide a liquid and gas separator unit so constructed as to afford a maximum of surface contact to facilitate the scrubbing effect upon the gas passing therethrough.

A still further object of the present invention resides in my improved means for creating what may be called a quiet zone in the lower portion of the separator unit whereby an efficient drawing off of separated liquid is permitted.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views.

Figure 1:
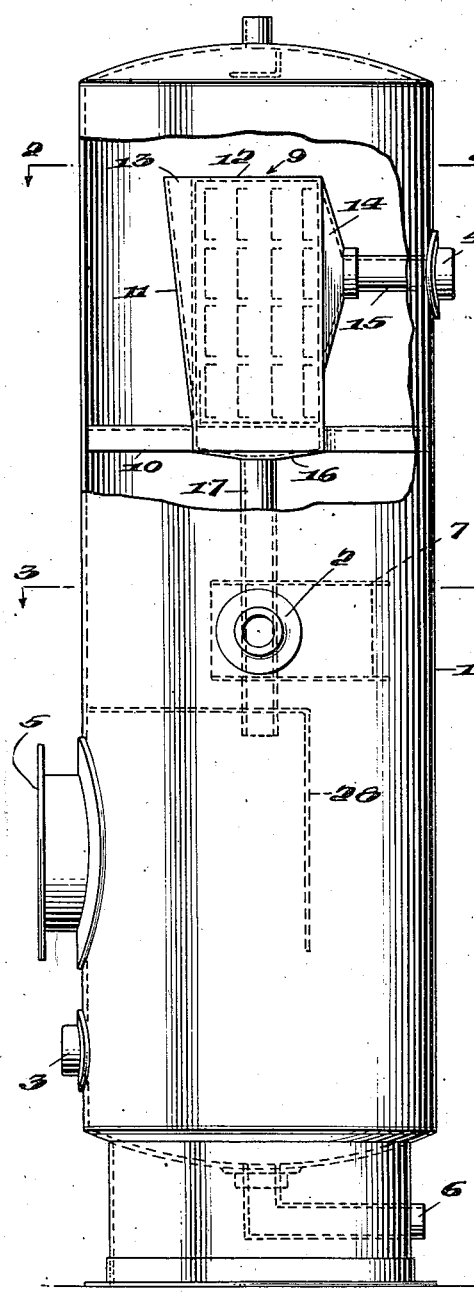
Fig. 1 is a view in side elevation partially broken away illustrating my improved separator unit installed in a conventional oil and gas separator tank.
Figure 2:
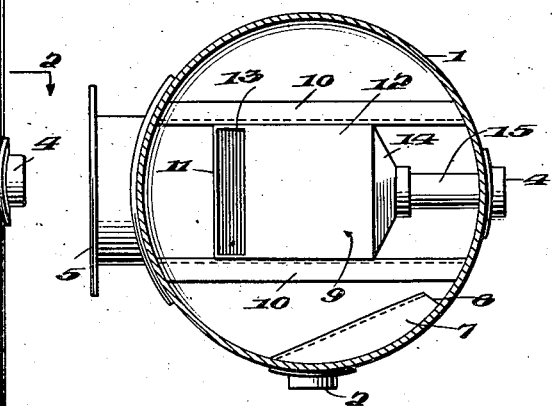
Fig. 2 is a transverse sectional view taken on line 2—2 of Fig. 1.

In the drawings, the numeral 1 represents a conventional oil and gas separator tank of the type comprising a vertically disposed cylindrical receptacle having an oil and gas inlet 2 substantially midway of its vertical extremities, an oil outlet 3 adjacent its bottom, a gas outlet 4 in its upper portion, a clean-out opening 5 in one of its side walls, and a drain outlet 6 at its lowest extremity. Adjacent the inlet opening 2 is provided a diverter or baffle 7 which lies tangentially against the inner wall of the tank 1. This diverter is spaced from the inlet 2 and closed at top and bottom, leaving a vertical slot 8 through which the incoming mixture of oil and gas is deflected against the walls of the tank 1 to set up a centrifugal force within the tank.

At a suitable point in the upper portion of the tank 1 my improved separator unit or mist extractor generally indicated by the numeral 9, is supported upon two transverse beams or angle irons 10 extending across the separator tank 1.

This separator unit 9 consists of a box-like casing having a forwardly inclined front wall 11, the top 12 of said casing terminating a short distance from the upper extremity of said inclined wall 11 to provide a transverse elongated inlet opening 13 for the entrance of gas and entrained liquid particles. The rear wall 14 of said casing is outwardly bent at converging angles which terminate in communication with an outlet conduit 15 connected into the gas outlet 4. The bottom 16 is provided with a centrally disposed opening into which is connected a downcomer 17, the latter extending to a point in the lower portion of the separator tank.

A predetermined distance above the bottom 16, I provide a horizontally disposed false bottom 18 having a series of staggered rows of perforations 19. Resting upon the false bottom 18 and extending from front to rear of the casing are a series of vertically disposed separator elements 20. These elements are preferably formed of corrugated sheets suitably stamped to provide vertically disposed cut-out vanes 21 as clearly shown in Figs. 4 and 5. These sheets are assembled in the casing in back to back relation, that is, the convolutions of the adjacent corrugated sheets are oppositely disposed so as to alternately provide engaging convolutions as at 22 and spaced convolutions as at 23. The spaces between adjacent pairs of sheets form a series of circuitous passageways 24 extending longitudinally across the separator unit, the inlet ends of said passageways being spaced from the inclined wall 11 and the discharge ends being spaced from the converging rear wall 14.

The sheets 20 may be secured together in the proper relationship by any suitable means such as spot welded or by the use of elongated bolts which extend transversely through the casing. I preferably spot weld adjacent sheets at points 22 where the opposite convolutions engage one another and secure the entire assembly of sheets in place by the use of bolts and spacers. These bolts and spacers have been omitted from the drawings in the interest of clarity.

Figure 4:
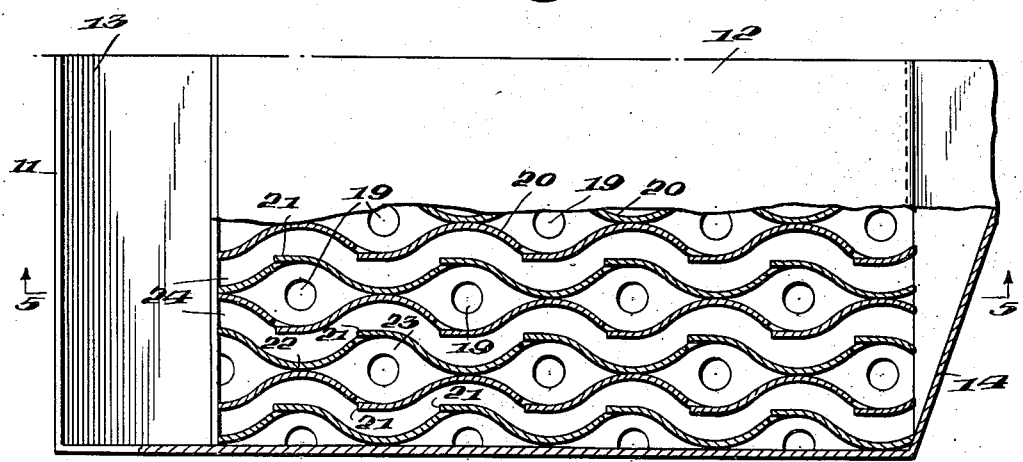
Fig. 4 is an enlarged fragmentary view partially in section and looking down upon the top of the separator unit, and, Fig. 5 is a vertical sectional view taken on line 5—5 of Fig. 4.
Figure 5:
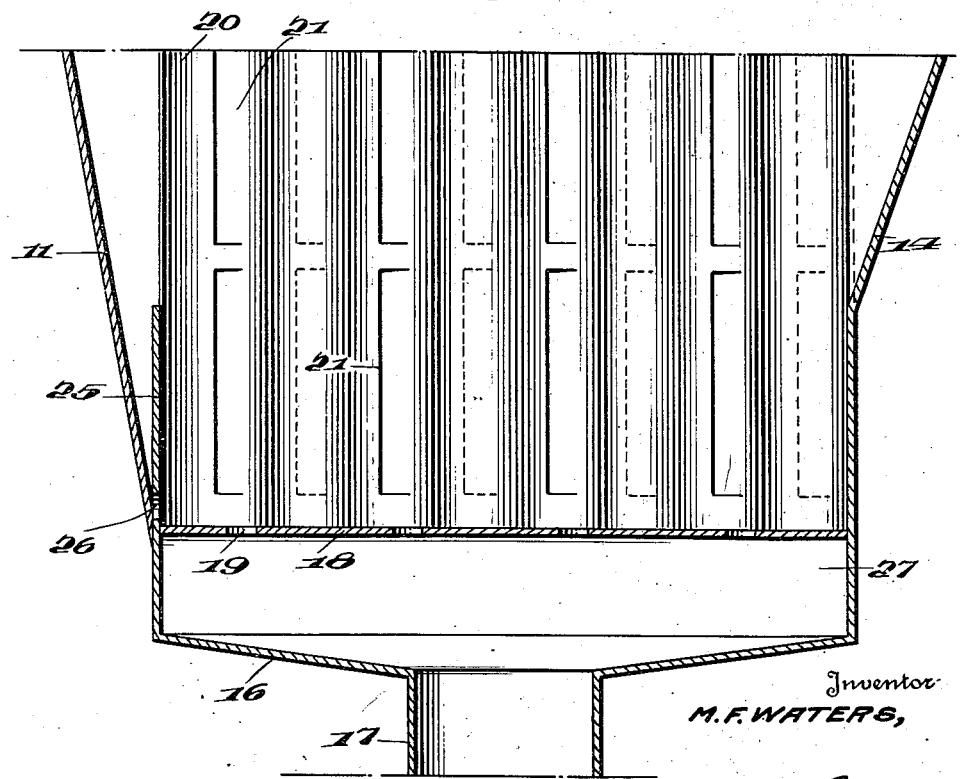

As will be seen from Fig. 4, the spaced convolutions 23 form scrubbing chambers which are arranged in staggered relation, one adjacent each perforation 19 in the false bottom 18, said chambers being otherwise closed except for the outwardly stamped vanes 21 which are directed toward the inlet ends of the passageways 24 and form inlet openings for the chambers 23.

In the lower extremity of the inclined wall 11, I provide a vertically disposed baffle 25 which extends upwardly a predetermined distance and lies in contact with the forward edges of the sheets 20, said baffle being provided with a series of transversely spaced ports 26. This baffle is for the purpose of creating a quite area adjacent the lower end of the separating unit, whereby liquid once within this area will readily drain through the openings 19 in the false bottom 18 without being disturbed by the turbulence of the gas passing through the unit, the ports 26 at the lower end of the baffle 25 permitting the escape of liquid which might collect between said baffle and the wall 11.

That portion of the casing below the false bottom 18 forms a liquid collecting compartment 27 from which the separated liquid escapes through the downcomer 17.

Figure 3:
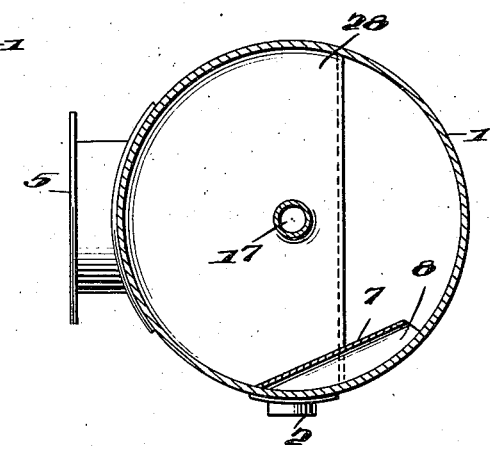
Fig. 3 is a similar view taken on line 3—3 of Fig. 1.

In the form of my invention illustrated in the drawings, a float hood 28 is provided to prevent the surging effect of the incoming mixture of oil and gas from interfering with the proper operation of the float. As will be seen from Figs. 1 and 3, this hood consists of a baffle plate bent downwardly at right angles, its upper wall being provided with an opening to receive the downcomer 17 which discharges beneath said hood.

Having thus described the construction and assembly of my improved oil and gas separator unit, its operation is as follows.

A mixture of oil and gas enters the tank 1 through inlet 2 where it is deflected against the inner walls of the tank by the baffle 7 which imparts thereto a centrifugal motion causing an initial separation of oil from gas. The oil flows to the bottom of the tank where it is periodically drawn off through oil outlet 3, the gas rising to the upper portion of the tank. This gas with any entrained liquid particles enters the separator unit 9 through the opening 13 in the top thereof from whence it is deflected by the inclined front wall 11 and travels horizontally through the circuitous passageways 24. During its flow through these passageways the tendency of the fluid mixture to continue in a straight line causes said mixture to contact the outwardly bent vanes 21 which scrub the gas of any liquid particles contained therein, said liquid particles collecting in the various scrubbing chambers 23 and draining through the openings 19 in the false bottom 18 and from thence through downcomer 17 to the oil receiving portion of the tank 1. The denuded gas leaves the discharge ends of the passageways 24 and is directed by the converging rear wall 14 through the conduit 15 to the gas outlet 4.

While I have shown and described my preferred form of separator unit, it will be understood that I do not intend to confine myself to the specific structure illustrated. For example, instead of the forwardly inclined front wall 11 and the elongated top inlet 13, I may employ a casing wherein the front wall is eliminated to provide a front inlet opening for the mixture of oil and gas. Obviously, so far as the separator element within the casing is concerned, the functions would be similar in both instances.

It will thus be seen that I have provided an extremely simple separator structure which at the same time provides a maximum of efficiency in the extraction of entrained liquid particles from gas.

From the foregoing it is believed that my invention may be readily understood by those skilled in the art, it being borne in mind that numerous changes may be made in the details of construction without departing from the spirit of the invention as set forth in the appended claims.

What I claim and desire to secure by Letters Patent is:

1. In a liquid and gas separator, a separator unit comprising a casing having gas inlet and outlet openings arranged at opposite ends, a plurality of substantially vertical, corrugated plates arranged in pairs, the plates of each pair being transversely spaced to form a circuitous passageway connecting said inlet and outlet openings, adjacent pairs of plates being oppositely disposed with alternate corrugations of immediately adjacent plates in abutment, the opposed intervening corrugations forming staggered longitudinal rows of liquid collecting chambers, the walls of said chambers being provided with openings communicating with respective passageways, means adjacent said last named openings for deflecting liquids into said chambers, discharge means in the bottoms of said chambers for conducting separated liquids therefrom and a transverse baffle extending across the lower portions of said plates at their forward ends to create a substantial quiescence adjacent said discharge means.

2. In a liquid and gas separator, a separator unit comprising a box-like casing having gas inlet and outlet openings arranged at opposite ends, a horizontal partition forming in the bottom of said casing a liquid collecting compartment, a plurality of substantially vertical corrugated plates arranged in pairs above said partition, the plates of each pair being transversely spaced to form a circuitous passageway connecting said inlet and outlet openings, adjacent pairs of plates being oppositely disposed with alternate corrugations of immediately adjacent plates in abutment, the opposed intervening corrugations forming staggered longitudinal rows of liquid collecting chambers, the corrugations forming the walls of said chambers being provided on their upstream sides with finned slots in the line of flow through respective passageways to permit the entrance of liquids into said chambers, said partition being provided with drain openings adjacent each of said chambers, means for conducting separated liquids from said liquid compartment and baffle means above said partition for creating a substantial quiescence adjacent said drain openings.

3. In a liquid and gas separator, a separator unit comprising a box-like casing having a forwardly inclined front wall, a transversely elongated inlet in the top of said casing adjacent the upper extremity of said inclined wall, a gas outlet in the rear wall of said casing, a plurality of substantially vertical corrugated plates arranged in pairs in said casing with their forward edges spaced from said front wall, the plates of each pair being transversely spaced to form a circuitous passageway connecting said inlet and outlet openings, adjacent pairs of plates being oppositely disposed with alternate corrugations of immediately adjacent plates in abutment, the opposed intervening corrugations forming staggered longitudinal rows of liquid collecting chambers, the corrugations forming the walls of said chambers being provided on their upstream sides with openings in the line of flow through respective passageways to permit the entrance of liquids into said chambers, discharge means for conducting liquids from said chambers and a transverse baffle extending across the lower portions of said plates adjacent said inclined front wall to create a substantial quiescence in the lower portion of said casing adjacent said discharge means.

MILLARD F. WATERS.